(12) United States Patent
Griffioen et al.

(10) Patent No.: US 6,682,052 B2
(45) Date of Patent: Jan. 27, 2004

(54) OPTICAL CABLE INSTALLATION WITH MINI-BEND REDUCTION

(75) Inventors: Willem Griffioen, Ter Aar (NL); Arie Van Wingerden, Hendrik Ido Ambacht (NL); Cornelis Van 'T Hul, Den Hoorn (NL); Pieter Lock, 's-Gravenhage (NL); Willem Greven, Delfzijl (NL); Frans Robbert Bakker, Wagenborgen (NL); Gerard Plumettaz, Bex (CH)

(73) Assignee: NKF Kabel B.V., Gouda (NL)

( * ) Notice: Subject to any disclaimer, the term of this patent is extended or adjusted under 35 U.S.C. 154(b) by 0 days.

(21) Appl. No.: 10/105,503

(22) Filed: Mar. 25, 2002

(65) Prior Publication Data

US 2002/0162993 A1 Nov. 7, 2002

Related U.S. Application Data

(62) Division of application No. 09/822,118, filed on Mar. 30, 2001.

(51) Int. Cl.[7] ............................................... B65H 59/00
(52) U.S. Cl. ............................ 254/134.4; 254/134.4 R
(58) Field of Search ....................... 254/134.4, 134.3 R, 254/134.3 FT; 15/109.06 R (56) References Cited

U.S. PATENT DOCUMENTS

| | | | |
|---|---|---|---|
| 5,308,041 A | | 5/1994 | Griffioen et al. |
| 5,681,131 A | * | 10/1997 | Goldenberg et al. ..... 405/183.5 |
| 5,884,384 A | * | 3/1999 | Griffioen ..................... 29/468 |
| 6,059,264 A | * | 5/2000 | Kaminski et al. ......... 254/134.4 |
| 6,070,857 A | | 6/2000 | Dragsund et al. |
| 6,170,804 B1 | * | 1/2001 | Allen ....................... 254/134.4 |
| 6,173,107 B1 | | 1/2001 | Reeve et al. |
| 6,179,269 B1 | * | 1/2001 | Kobylinski .......... 254/134.3 R |
| 6,311,953 B1 | | 11/2001 | Lang et al. |

* cited by examiner

*Primary Examiner*—Lee D Wilson
(74) *Attorney, Agent, or Firm*—Dennis T. Grigge (57) ABSTRACT

A cable straightener removes mini-bends from cable as it is unwound from a reel for installation in an underground duct, providing improved blowing performance for any cable with non-negligible stiffness and that exhibits reel-set or shape memory recovery, for example cables enclosed within small diameter tubular steel jackets, cables enclosed within aluminum laminated polymer sheets, and cables enclosed within hard polymer tubing. Residual stresses induced in such cables are reduced by first and second sets of straightener rollers prior to pushing/blowing installation.

20 Claims, 5 Drawing Sheets

OPTICAL CABLE INSTALLATION WITH MINI-BEND REDUCTION

CROSS-REFERENCE TO RELATED APPLICATIONS

This application is a divisional of co-pending U.S. application Ser. No. 09/822,118 filed Feb. 30, 2001.

STATEMENT REGARDING FEDERALLY SPONSORED RESEARCH OR DEVELOPMENT

Not applicable.

BACKGROUND OF THE INVENTION

This invention relates generally to optical telecommunications networks, and in particular to methods and apparatus for installing fiber optic communication cables within a protective conduit such as an underground duct.

Various factors must be considered when a fiber optic cable is installed in a protective duct. A major concern is avoidance of damage to the cable during installation. Another concern is ease of installation and the desire for a reduction in the amount of time needed to install the cable. Generally, it is desirable to install the longest continuous length of cable possible to reduce the number of splices needed for the cable run.

Protective cable ducts have been channelized in an effort to satisfy these concerns. For this purpose a tubular conduit, whose interior may have a lower coefficient of friction than the existing duct, is installed in the existing protective duct, thereby establishing a separate channel in which a cable, optionally at a later time, can be blown or flowed through the protective duct over a greater length.

U.S. Pat. Nos. 4,850,569 and 4,934,662 to Griffioen et al. describe combining high speed air flow with a pushing force applied at the entry end of the conduit to install a traditional (i.e. with non-negligible stiffness) cable. U.S. Pat. Nos. 5,197,715 and 5,474,277 to Griffioen further describe the use of a guide shuttle attached to the lead end of the cable which adds a tension force on the lead end of the cable, in addition to the motive forces applied to the cable via the high speed moving air.

During blowing/pushing installation of a cable, the propelling air-drag force developed by the volumetric flow of air through the duct is proportional to the compressor output pressure and cable diameter. However, the frictional load imposed by rubbing against the duct interior sidewall is proportional to the cable weight, hence to the square of the cable diameter. Moreover, a cable that fills the duct for a large part is subjected to extra friction caused by bends and undulations in the duct due to the stiffness of the cable, which increases with the fourth power of the cable diameter. On the other hand a cable that just fits in the protective duct can be pushed harder without buckling, but the frictional loading caused by rubbing engagement of the cable against the protective duct imposes a limit on the continuous installation length that can be obtained by pushing/blowing.

A well-known method for installing cables in ducts is a synergy of pushing and blowing as described in U.S. Pat. No. 4,850,569 to Griffioen. This method is being used now for a wide variety of cables and ducts, from small (4 mm optical cables in 7/5.5 mm guide tubes) to large (35 mm copper balanced cables in 63/50 mm ducts). The theory of this technique is described in EP 0734 109 B1 (Griffioen). According to this theory, cables with only a little play in the duct can be installed over long distances. Although the stiffness of the cable contributes more to the friction when passing bends and windings (undulations) in the trajectory, pushing becomes more efficient because the cable has less play to develop buckling.

The results of installing cables in ducts with only a little play are not predictable. Sometimes the performance is as expected but more often the blowing lengths are considerably less. Less than satisfactory performance has been experienced in many countries, e.g. in The Netherlands where such problems have occurred for many years now when installing 17 mm optical cables in 32/26 mm ducts. For this no explanation was found until now.

Typically, fiber optic cable is manufactured and then tightly coiled about a reel for ease of storage, shipment and handling. The cable reel is positioned for rotation adjacent an insertion station, and the cable is unwound from the reel and fed into an open duct. As a result of being tightly wound about the reel, residual stresses are induced into the winding coil turns of the cable. Thus the cable as it is unwound is subject to "coil-set," in which the cable develops an arcuate bend that lies in a plane which is referred to as the arc plane. As the cable is unwound from the reel, the residual stresses cause it to curve and attempt to recover to its previous coiled shape, thus producing a series of undulations or bends of a slightly helicoidal form in the arc plane. Besides the coiled shape the cable also may suffer from "mini-bends." These bends are irregular and can be caused by the coiling process when not perfectly done, e.g. warping when turns cross each other. Other steps in the production and handling of the cable, e.g. bending, twisting or kinking during installation, also contribute to these mini-bends. All of these cable bends substantially limit the installation length of the cable run.

The limiting effect can be understood by realizing that cable mini-bends of only a few millimeters in amplitude can cause substantial friction between the (stiff) cable and the tubular conduit in which there is only minimum clearance, for example 1.5 mm play. The relative effect of the cable stiffness as the cable traverses winding undulations of the duct trajectory is characterized by the ratio of the normal force $W_B$ resulting from the cable stiffness with respect to the normal force of the effective cable weight $W_f$ (normal weight in air, in liquid correction for floating). This relationship can be expressed as follows:

$$\frac{W_B}{W_f} = \frac{3AB}{2W_f(P/4)^4}$$

Here A and P are the amplitude and period, respectively, of the winding undulations in the duct trajectory and B is the cable stiffness. Amplitudes of about 5 cm in windings of ducts or guide tubes, present in many practical trajectories, usually do not contribute significantly to the stiffness friction. For protective ducts of e.g. 40/32 mm the period of the windings is usually large, e.g. 10 m. In this case the contribution of the cable stiffness B to the friction between cable and duct is negligible. For a cable with e.g. a diameter of 10 mm (free play 22 mm), a stiffness B of 1 Nm$^2$ and a weight of 1 N/m the ratio $W_B/W_f$ is only 0.0015. In the case of a tight fitting cable with a diameter of 17 mm, a weight of 2.5 N/m and a stiffness of 5 Nm$^2$, to be installed in a 32/26 mm duct (usually shorter period of windings, e.g. 6 m; free play 9 mm), the ratio $W_B/W_f$ becomes 0.027, still negligible.

For the smaller 7/5.5 mm guide tubes the winding period is usually less, e.g. 1 m, which would result in a much higher contribution to the friction according to the 4$^{th}$ power dependency of the winding period. Even with the smaller stiffness of e.g. 0.06 Nm² of the 4 mm cable (weight 0.1 N/m) that fits (free play 1.5 mm) into the 7/5.5 mm guide tube the ratio $W_B/W_f$ with its value of 11 is much higher here. Note that this factor would mean a reduction in blowing distance by an order of magnitude. Fortunately, the stiffness of the guide tubes is so low that they can adjust to the shape of the cable easily, without causing too much friction.

For mini-bends in the stiff cables the amplitudes are much smaller and the periods shorter, e.g. 20 cm. Treating these mini-bends the same way as the windings in the tubes a ratio $W_B/W_f$ of 180 is found for a winding amplitude of only 2 mm. Again the low stiffness of the guide tubes reduces this effect, but a severe reduction in blowing length remains. This numerical example only serves as illustration. The estimation of the stiffness friction effect is not accurate, and the effect of the mini-bends in the cable has to be determined by trial and error.

Another example is the tight fitting 17 mm cable in the 32/26 mm duct. Small bends in the cable (resulting from handling or winding the cable) with only 1 cm in amplitude and 1 m in period result in a ratio $W_B/W_f$ of 4.2. In this example the duct does not adjust to the shape of the cable and installation length is substantially reduced. The cable straightening method of the present invention reduces the amplitude of the mini-bends, making possible much longer installation runs.

BRIEF SUMMARY OF THE INVENTION

It has been found in field testing, for example with 4 mm optical cables encased within a steel tube (i.e. very stiff for the size) blown into 7/5.5 mm mini-tubes, that straightening the cable (by means of a straightener roller set) before entering the blowing unit will improve the installation length surprisingly by more than 30%. For cables where mini-bends are more severe (i.e. clearly visible) the improvement becomes even greater.

The method of using a cable straightener before insertion will result in improved blowing performance for any cable with non-negligible stiffness and that exhibits shape recovery "memory," such as stiff cables enclosed within steel tubes, cables enclosed within aluminum laminated polymer sheets, etc. The beneficial effect of the cable straightener is most pronounced when the relative play of the cable is less and when the stiffness of the cable is larger.

Of special interest is the use of the cable straightener in combination with the flowing installation method. Here the friction between cable and duct is minimized because of floating the cable in the liquid (typically water) used for propelling the cable. Extremely long lengths can be installed in theory when the density of the cable is chosen close to the density of the liquid used for the installation. The only contribution to the friction that remains is the stiffness of the cable in bends and windings in the duct trajectory. And, for tight fitting and stiff cables an even larger contribution to the friction (this effect is already present when installing with compressed air) is expected due to mini-bends in the cable, where the ratio $W_B/W_f$ becomes very large for small $W_f$. Pre-straightening the cable will have a much larger beneficial effect in that case.

BRIEF DESCRIPTION OF THE DRAWING

The accompanying drawing is incorporated into and forms a part of the specification to illustrate the preferred embodiments of the present invention. Various advantages and features of the invention will be understood from the following detailed description taken in connection with the appended claims and with reference to the attached drawing figures in which:

DETAILED DESCRIPTION OF THE INVENTION

The invention will now be described on the basis of examples where cables are installed in protective underground cable ducts. Unless otherwise specified, all dimensions are given in metric units.

The cable straightener method of the present invention removes mini-bends, coil-set and other irregularities from cable before insertion, providing improved blowing performance for any cable with non-negligible stiffness and that exhibits shape memory recovery, for example cables enclosed within small diameter tubular steel jackets, cables enclosed within aluminum laminated polymer sheets, and cables enclosed within hard polymer tubing. Residual stresses induced in such a cable as a result of handling, coil-set and other steps in the coiling and production process are reduced by first and second sets of roll straighteners as the cable is unwound from the reel.

Figure 1:
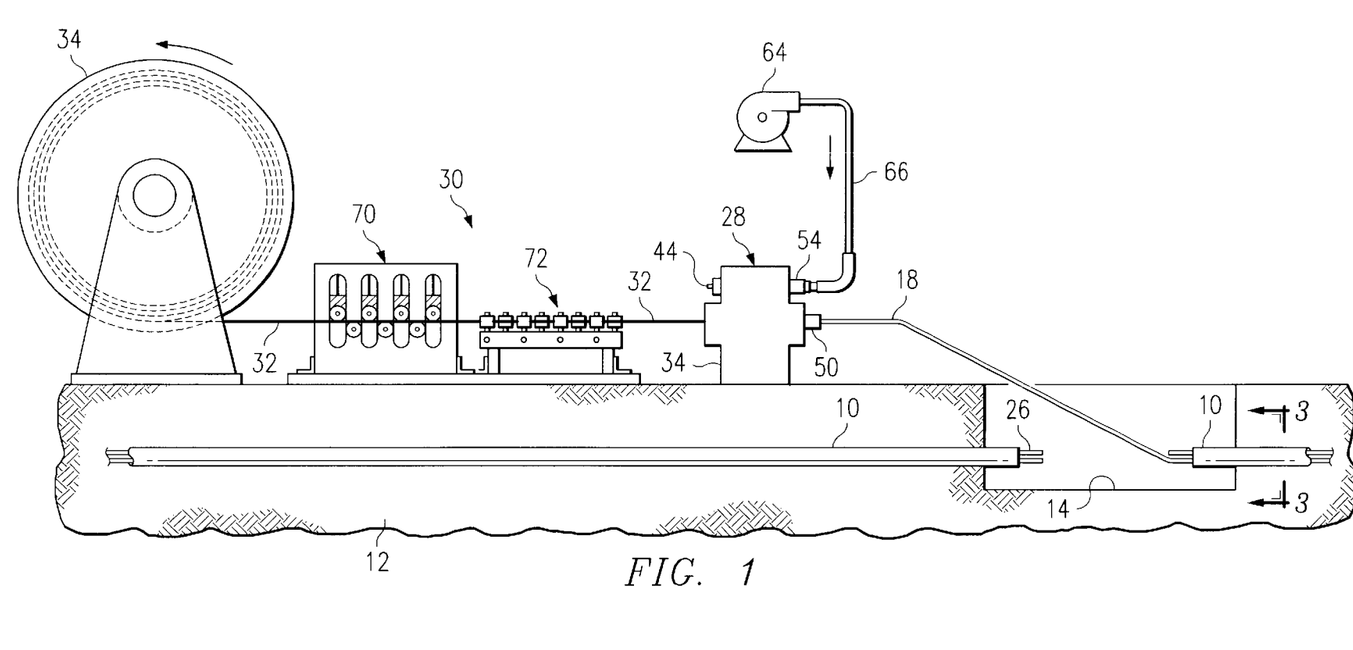
FIG. 1 is a schematic side elevation view showing installation of a cable in an underground protective duct according to the mini-bend reduction method of the present invention.

A portion of a typical underground conduit network is schematically shown in FIG. 1. The network includes a longitudinally extending trajectory duct or conduit, typically made of a sturdy plastic material of e.g. one and a quarter, two or four inches in diameter. The conduit 10 is buried in the ground 12 and is carrying small diameter guide tubes in which cables are to be installed. The conduit 10 and its cables typically extend several thousand feet, and a launch station, such as at a handhold 14, is located at a predetermined central location. Here guide-tubes 16,18,20,22 and 24 extend out of the protective duct 10. In the hand-hole 14 also blowing/pushing equipment can be used in tandem operation. The guide-tubes 20, 22, 24 where no cables have been installed are sealed off by end caps 26.

A cable insertion unit 28 is asset up adjacent the hand-hole 14, in conjunction with a cable straightener unit 30, to introduce a cable 32 in one of the guide tubes. A supply of new fiber optic cable, usually consisting of thousands of feet, is coiled or wound on a reel 34 positioned above ground. The cable 32 is unwound from the reel and is fed into the cable straightening unit 30.

After the straightening step, the cable is fed into the cable insertion unit 28, for example, a combination pushing blowing unit of the type sold by Sherman & Reilly, Inc. of Chattanooga, Tenn., or as shown in U.S. Pat. No. 4,850,569, to which reference is made for whatever details described therein as may be necessary for the full understanding of the operation of the blowing unit.

The cable 32, coming from the straightener 30, is installed into the guide-tube 18. This is done with the synergetic blowing and pushing unit 28. Inside the housing 34 (two sections fastened together, see FIG. 2, only the bottom section shown of this equipment shown) the cable 32 is pushed by means of a mechanically (electric or pneumatic) driven wheel 36 which has an outer layer of machined hard metal with a groove for engaging the cable. In order to grip the cable a second (not mechanically driven) wheel 38 is pushed against the drive wheel 36. Pushing of the wheel 38, which can pivot on arm 40, is done via spring 42 by turning around the adjustment wheel 44 to control the pushing force of the drive wheel 38. The cable 32 enters the housing via a conical feed-through 46 that is cut to fit exactly the cable size. This feed-through is mounted on a splittable cylindrical entrance duct 48 that makes an airtight sealing when the housing is closed. The guide-tube 18 is received in a splittable cylindrical exit duct 49 also making airtight sealing. The guide tube 18 extends into the housing 34 until almost touching the wheels, to avoid buckling. Optionally the guide-tube 18 can be mounted using a push/pull connector 50. Air is fed using connection 52 via valve 54. The sections of the housing are closed with bolts and nuts through holes 56. For proper alignment, pin-and-holes 58 are used.

Figure 4:
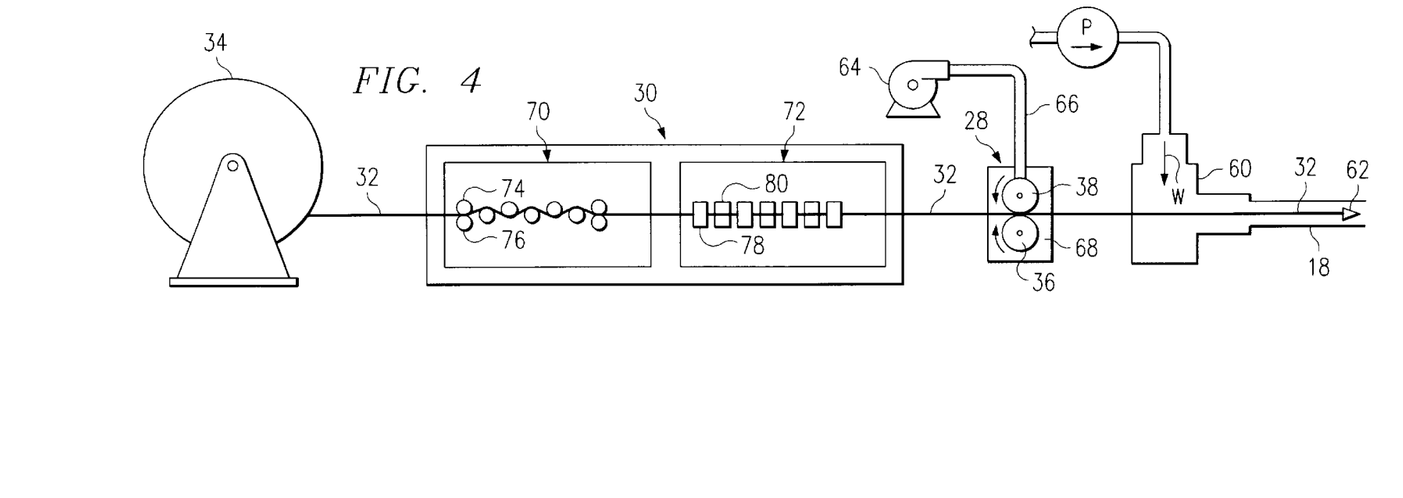
FIG. 4 is a simplified schematic view showing installation of cable by pushing and flowing following pre-straightening of the cable.

Alternatively, the blowing unit can utilize a set of mechanically driven tractor drive treads to engage and advance the cable 32. In addition, the insertion unit can also provide pressurized water W to move the cable as shown in FIG. 4. The input end of the conduit section opposite to the end received in a hydraulic launch block 60 is attached to the insertion unit with a suitable water-tight seal (not shown) being provided. Thus, water W under pressure is provided through a conduit section and into the launch block. Because all portions of launch block are sealed, except the entrance to the conduit end, the water under pressure enters conduit 18 at the conduit end and acts on the entire length of the cable (water speed much higher than cable speed) or on a dart piston device 62 to move the cable through the conduit.

Referring again to FIG. 1, sources of compressed air, hydraulics, or electric power are connected to the cable feeder 28. Preferably, the compressed air is provided by a compressor 64 through delivery conduit 66 at 175 to 375 cubic feet per minute (CFM) and 90 to 175 pounds per square inch (PSI). For the small size cables, installed in the guide tubes, in principle a capacity of 50 cubic feet per minute is sufficient. Alternatively, another fluid can be used instead of compressed air. The hydraulics are preferably provided at 2 to 5 gallons per minute (GPM) and 600 to 1500 PSI.

An entrance duct clamp releasably holds the entrance duct for guiding the cable 32 toward the cable driver 36. Preferably, the entrance duct is a length of polyethylene tubing.

The air injection block 34 is provided with an entrance seal insert and an exit seal insert adapted to permit passage of the cable 32 while maintaining an airtight seal. The injection block 34, entrance seal insert, and exit seal insert are each separable into two generally symmetrical halves to permit installation of the cable 32. The seal inserts are removable and replaceable with similar inserts adapted for different cable and conduit diameters. The entrance seal insert provides a passage slightly larger than the cable. A pair of gaskets are provided in the entrance seal insert to seal around the cable. A fitting is provided to permit injection of compressed air into the injection block 34.

The exit duct clamp is secured to the air injection block 34 to secure the duct to the injection block. The injection block defines a plenum 68 closed by the entrance seal insert and the exit seal insert. A guide duct is releasably held in the exit duct clamp. Preferably, the guide duct is a cylindrical length of polyethylene tubing. A duct seal, such as a pair of gaskets, is provided to seal around the guide duct. The exit duct clamp and duct seal the injection block and guide duct to direct passage of air from the plenum into the guide duct.

Referring again to FIG. 1 and FIG. 2, prior to installation in the cable duct 18, a leading end of the cable 32 is sealed with a smooth plug or cap having a diameter only slightly larger than that of the cable, e.g. made of brass, or other low friction material.

Figures 2, 3:
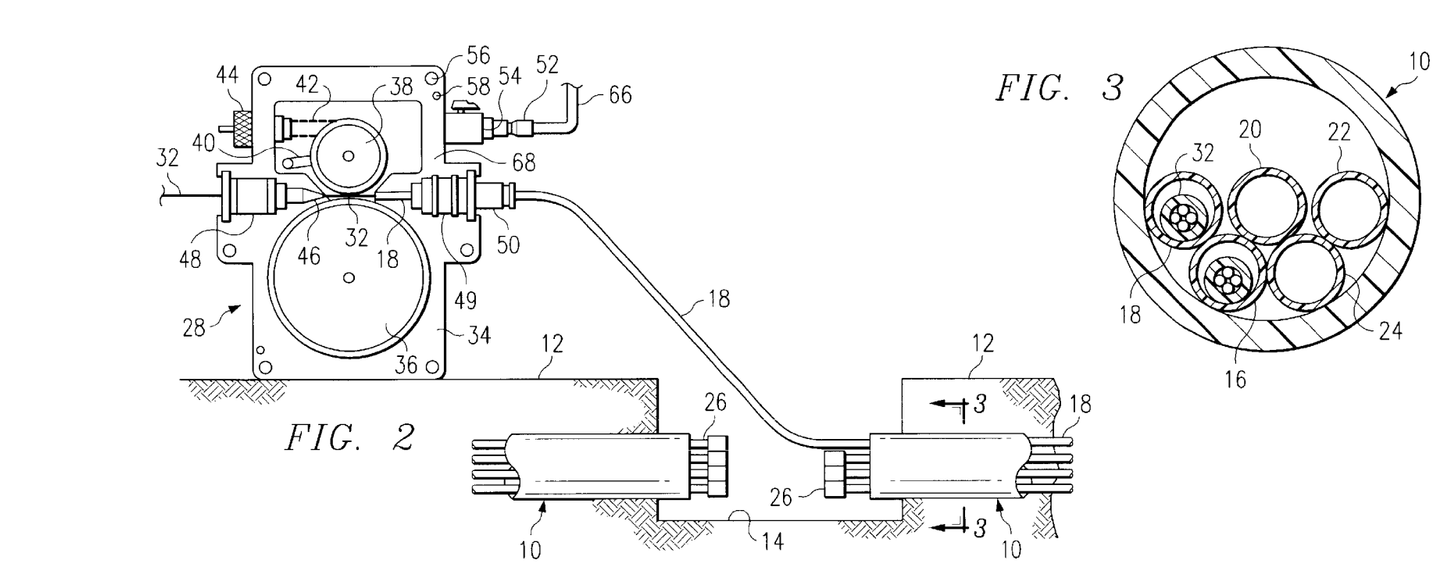
FIG. 2 is simplified schematic view showing installation of a cable by pushing and blowing following pre-straightening of the cable.
FIG. 3 is a sectional view taken along the line 3—3 of FIG. 1 showing a loose bundle of guide tubes laid in a large protective duct in which the pre-straightened cable of FIG. 1 has been installed.

To set up the cable feeder 28, as shown in FIGS. 1 and 2, a length of cable is unrolled from the reel 34 and inserted in the entrance duct 48. The cable is positioned so that it extends from the end of the entrance duct approximately the length of the cable feeder. A cable with the smooth plug is inserted into the guide duct 18. The cable feeder is positioned adjacent the cable. The drive wheels, injection block, clamps and seal inserts are separated to provide a generally horizontal passage into which the cable is transversely inserted. The separated parts are then reassembled, closed, and secured to the entrance duct, cable, and guide duct in the cable feeder.

The compressed air, hydraulic source, and/or electric power are connected and initiated to pressurize the plenum 68 and to activate the hydraulic system and the control system. Air flows at high speed along the cable, pulling the cable through the conduit. The actuator is switched on to provide hydraulic fluid (or compressed air or electric power) to the motors, and the drive wheels rotate, advancing the cable 32 through the conduit 18.

The cable may be bent or twisted during handling, winding or coiling as it is unwound from the reel 34 or other storage device, and is usually stressed so that it has a tendency to curve or coil into its previous shape, introducing a series of curves, mini-bends or other deviations into the cable to be laid. These curves and mini-bends can impose high frictional loading that limits feed rate and installation length. To overcome this problem, the cable 32 is first run through the straightener unit 30 for removing these stresses and bends so that the cable will remain as straight as possible.

The straightener unit 30 includes two straightener sections 70, 72 each having sets of opposed rollers 74, 76 and 78, 80 on opposite sides of the cable that deflect the cable as it is being pulled through. These straightener sections are arranged preferably in tandem one after the other with the rollers of section 70 at a 90 degree angle to the rollers of section 72 so that the cable is first deflected back and forth along one plane and then back and forth along another plane normal to the first plane. This deflecting, or working, of the cable 32 is schematically illustrated in FIG. 4 where the first set of upper rollers 74 are arranged adjacent a second set of lower rollers 76. The lateral spacing between adjacent rollers of the same set are identical. The spacing is small so that adequate deflection of the cable will occur to eliminate the induced bending stresses.

The upper rollers 74 are positioned offset with respect to the lower rollers 76, the set of lower rollers optionally being angled a small amount away from the set of upper rollers from left to right. As shown in FIG. 4, a cable 32 is in place between the two sets of rollers. The cable is pulled toward the right, as viewed in FIG. 4, causing the cable to undergo a maximum deflection in an upward direction followed by a maximum deflection in a downward direction. When the lower set of rollers are angled with respect to the upper set of rollers, the next upward deflection is less that the upward deflection and similarly, the next downward deflection is less than the previous downward deflection. The final upward and downward deflections, respectively, are less than the preceding deflections, respectively. Any other adjustment of the individual rollers is possible. Mathematic calculations, but in most cases trial and error, determine the best positions.

Straightening is performed preferably by deflecting the cable 32 further in the beginning of the operation and to progressively work it less and less as the cable is pulled toward the right, as viewed in FIG. 4. Initially when the cable is inserted between the two sets of rollers, it is somewhat straight and the two sets of rollers are further apart. The two sets of rollers are then adjusted toward each other thereby deflecting the cable to conform. This adjusting of the two sets of rollers toward each other is accomplished by a set screw.

The cable 32 may be considered to be essentially a beam that must be deflected by the first lower roller centered opposite the first two upper rollers. Because the beam is supported very close to the point where deflection is desired, the required force may be very high. This adjustment is made for each different cable diameter. Therefore, the two sets of rollers must be adjusted with respect to each other so that the cable is deflected an adequate amount to effectively relieve the internal stresses.

Care should be taken so that the force to feed the cable through the straightener should not be too high, nor the cable length may be altered (permanently) too much, to avoid changes in the cable properties, such as the "temperature window": when the relative over-length of the fibers with respect to the protective tubular jacket changes, the fiber buckles earlier when the temperature decreases, as a result of the tubular jacket crimping a little more than the fiber .

The straightener roller set consists of a number of rollers along the path for the cable, alternately on the upper and lower side of said path, the rollers on the upper side pushing the cable downward, and those on the lower side pushing upward, so that the cable will travel along an undulating path.

In using the method of the present invention, the first set 70 of rollers located on the entrance side of the straightener 30 are adjustable with respect to the vertical position, by means of a corresponding set screw, in order to adjust the degree of bending. In such a way the cable is submitted to the required series of alternating bendings in a vertical plane. The second set 72 of rollers is completely similar to the first set, but so oriented to submit the cable 32 to a series of alternating bendings in a horizontal plane.

Figure 7:
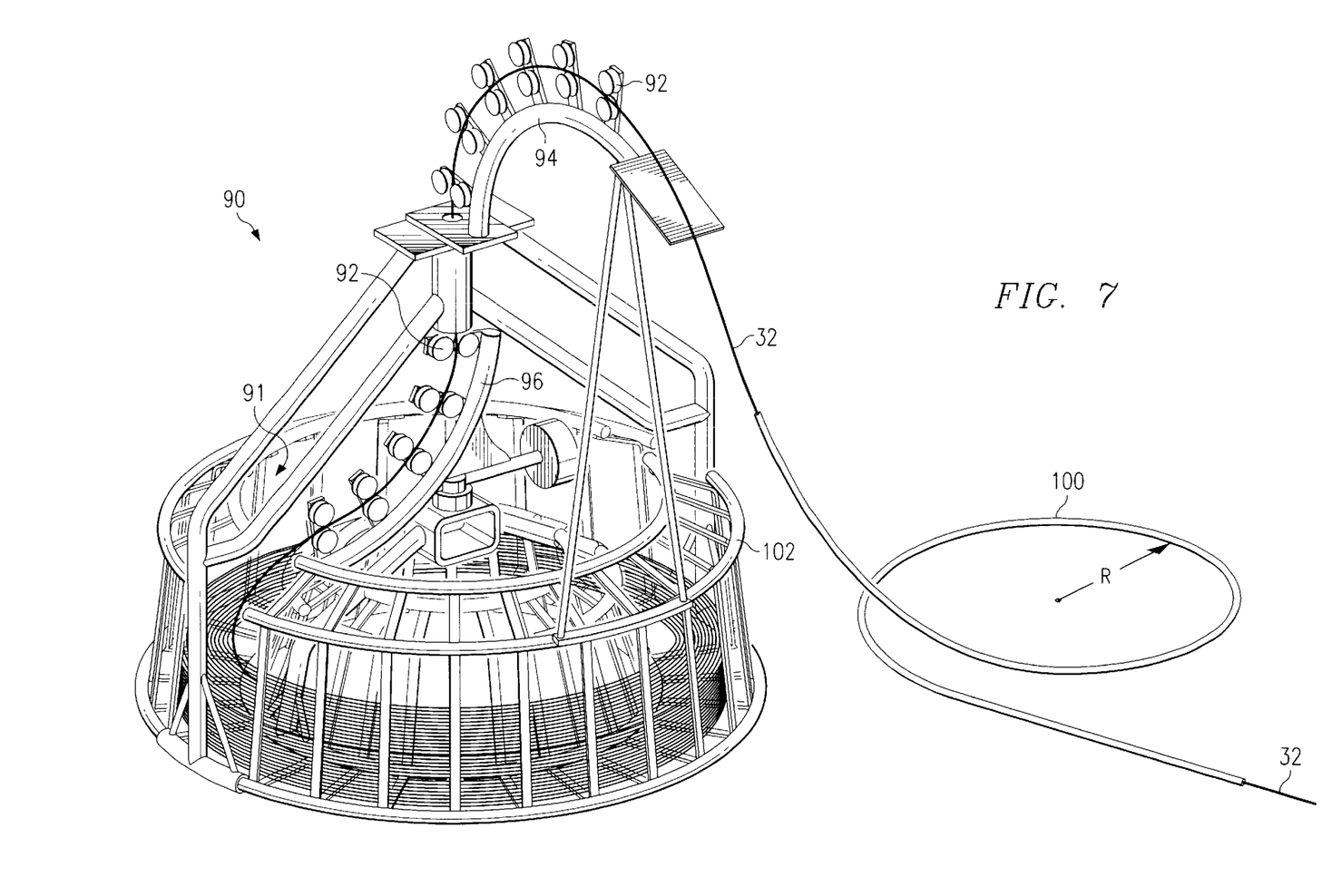
FIG. 7 is a perspective view which illustrates the use of a looped guide duct for eliminating left-to-right transitions during cable buffering and loop storage coiling and uncoiling.

The coil set of the cable 32 coming from the reel 34 and through the straightener 30 will not entirely vanish. The cable with its small curvature will find itself inside the guide tube 18 in a regular helical shape with very small winding radius and long pitch length. This itself is not a problem for the installation of the cable. Problems may occur, however, when the installation is used together with a cable buffering method, e.g., with a cable storage unit 90 as shown in FIG. 7. Here the cable 32 is coiled in loops and for every turn the cable must twist 360 degrees. Also, buffering cable storage can be performed by laying the cable in "figure-eight" loops on the ground.

Buffering is done by installing the cable 32 from a reel into a duct from a middle position in the duct trajectory in one direction. Next a loop of cable between the reel and the duct is taken and fed into the coiling device 90, through pairs of rollers 92 (see FIG. 7). The cable 32 is guided over a fixed arm 94 and over a spinning arm 96. Then the remaining cable length on the reel is coiled into a cage or basket 91 of the coiling device 90, e.g. by using the mechanical drive of the pushing unit 28. When the cable end is obtained, installation in the duct in the other direction is possible. This continues until the coiling basket 91 is empty, and the last turn has been taken out of the device.

This loop storage coiling process is usually performed without problems. When uncoiling the cable, the twists are released without permanent deformation and the cable returns to its normal state. But, sometimes a turn comes out without untwisting, and some turns later this is cancelled out by a double twist. The result is that the helical shape of the cable 32 in the guide tube 18 will show left-to-right transitions (comparable to the well-known S/Z stranding in optical cables). Such a transition induces substantial friction. In some test installations the installation length decreased by a factor of two because of the buffering.

This buffering problem is solved as follows. Immediately after the cable storage unit 90 (before going through the straightener 30) the cable 32 is advanced through a looped guide duct 100 (about one turn), with about the radius of curvature R as still remaining in the cable. This looped guide duct 100 will resist passing of a twist. So the cable 32 is forced to store exactly one twist per turn when loading the coiling device 90 and to release exactly one twist per turn when unloading.

The looped duct 100 can be supported on the ground next to the coiling storage unit 90, as shown in FIG. 7. Here the cable 32 goes through the looped duct 100 before entering the coiling device. The looped duct can be longitudinally splittable and re-sealable. If not, the cable 32 must be inserted through this duct before installation in the first duct direction takes place.

By this arrangement the looped duct 100 serves as a "twist freezer." The cable, with still a little curvature from coil set, will take the orientation such that the loop matches with the plane of curvature of the cable itself. Substantial effort is required to twist the cable inside this fixed loop. Hence, no twists will pass the looped duct 100 when the cable is stored into the coiling device 90. Inside the coiling device 90 every turn will make one twist. When uncoiling cable from the coiling device these twists are released, one by one, for every turn. It is not possible that sometimes a twist remains in the coiling device and sometimes two are released, since this would mean that a twist must be made inside the looped duct.

Because the buffering is used to install longer lengths without cutting the cable, e.g. installation from a middle point into two opposite trajectory directions, the looped guide duct 100 usually has to be cut away when the cable 32 has been installed, so the last portion of the cable can be inserted and the middle piece put straight. Therefore a loop construction with a splittable duct that can be longitudinally zipped is preferred.

Figure 8:
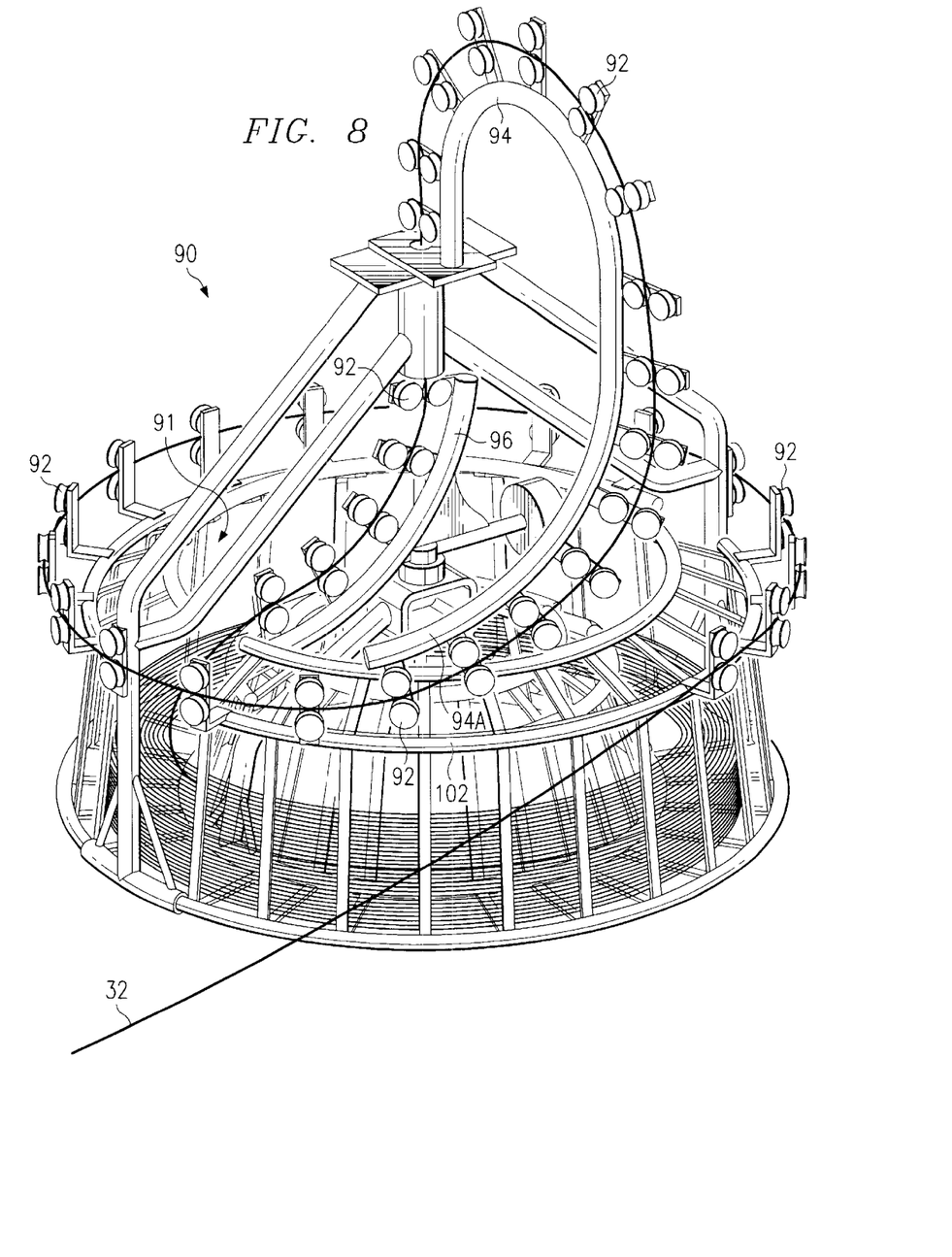
FIG. 8 is a perspective view similar to FIG. 7 in which a looped guide arrangement is integrated with the cable storage coiling device.

Another way to provide a fixed guide loop is to integrate the fixed guided loop with the coiling device 90, as shown in FIG. 8. Here the fixed loop 100 is formed by pairs of rollers 92 that can be opened and closed so that the cable 32 does not have to be inserted in the beginning, when installation in the first direction starts. Pairs of releasable guidewheels 92 are mounted in a circular array on a frame member 102 of the coiling device. Pairs of guide wheels 92 are also mounted on an extended portion 94A of the fixed arm 94 feeding the cable into the circular array of guide wheels on the frame 102.

The optical cables are the critical elements in the optical access network. Their function is to transport the information through the network. This must be done over the operating lifetime of at least 20 years without any degradation. Since the cable may face real outside plant conditions during handling and service they should be fully resistant to those conditions, e.g. they must withstand polluted water, oil and other harsh environment. In conventional cable construction, the fibers are enclosed within a thick polymer jacket, which provides some protection but limits the number of cables and fiber density in each guide tube, thus imposing a limit on the fiber density of the cables in the feeding duct and branch duct.

Figure 5:
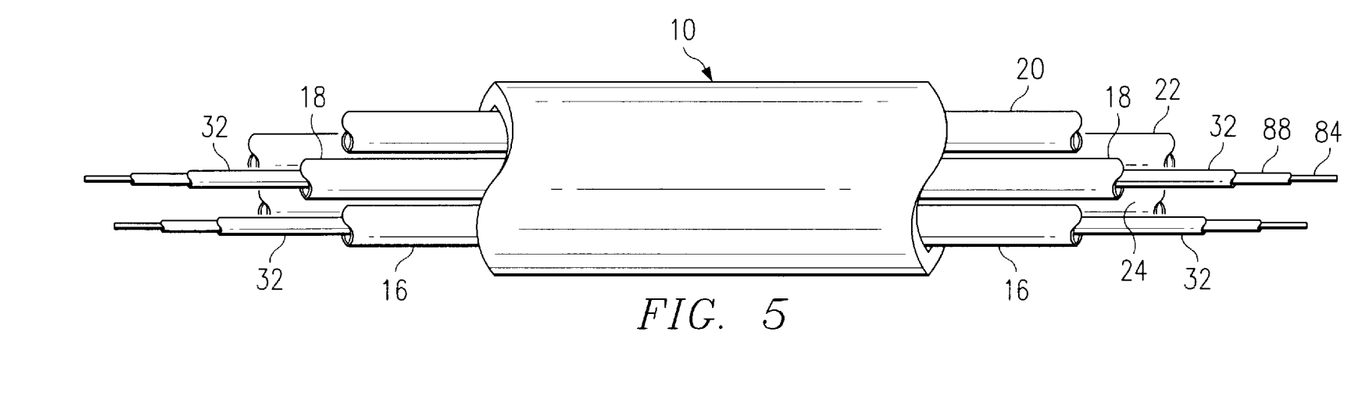
FIG. 5 is a side elevational view of the cable installation of FIG. 1.
Figure 6:
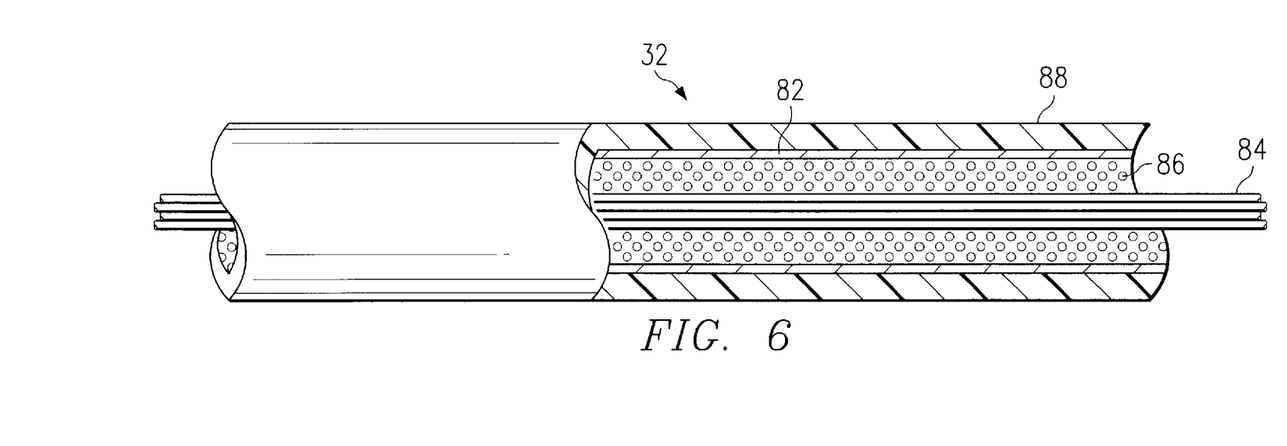
FIG. 6 is a longitudinal sectional view showing the preferred metal jacket construction of the fiber optic cable that is adapted for installation by the pre-straightening method of the present invention.

According to one aspect of the present invention, the fiber density limitation is overcome and installation length is improved by enclosing the optical fibers in a very small diameter metal tube. Referring to FIG. 5 and FIG. 6, the preferred fiber optic cable 32 of the present invention has a metal water-barrier jacket 82 which consists of a small diameter, thin sidewall laser-welded steel tube. This metal tube 82 is loosely filled with one or more optical fibers 84 and a gel waterproofing material 86, for example silicone gel or aquagel.

The function of the gel is to provide longitudinal watertightness. When the metal barrier 82 is leaking (transversal) somewhere, the gel 46 ensures that not a long length of cable is immediately flooded with water. Instead of gel also water-absorbent powder or tape may be used, which swells and forms an internal annular seal barrier that isolates the leaking zone. The fibers 84 are free to "float" within the steel tube 82, and thus are decoupled from external mechanical forces and stresses that act on the cable during installation.

A protective tubular jacket 88 of (foamed) high density polyethylene (HDPE) surrounds the small diameter steel tube 82. The welded steel tube and protective polymer jacket prevent water or other unwanted matter to penetrate into the cable. The steel-tube construction also offers sufficient mechanical protection against damage that could be caused by pushing, pulling, bending, crushing and all other handling. Because the water-barrier is fully hermetic the compatibility of all materials inside the barrier, especially the water and hydrogen content (hydrogen can cause optical attenuation), is of special importance.

The steel tube 82 has a high strength and a low thermal contraction coefficient, when compared to e.g. plastics. Because of this no additional strength members are needed (saves space). Also no large "play" of fiber length is needed in the cable because length differences between fiber 84 and cable 32 hardly vary with temperature. To get "play" of fibers, or fiber excess length, the fibers 84 are installed in a helical (or otherwise undulating) way inside the cable. The more excess length needed, the larger the diameter of the tube 82 needs to be (boundary conditions: the helical or undulating shape should not bend the fiber too much).

Because of the small "play" needed, the steel tube 82 and its polymer jacket can be made with a very small diameters. The steel tube construction permits very high fiber counts to be obtained in cables with small diameters. Preferred outside diameter/inside diameters for the steel tube 82 and outside diameter for the polymer jacket 88 are as follows: containing 4 fibers: steel tube—1.42/1.12 mm, polymer jacket—3.9 mm; 12 fibers: steel tube—2.0/1.8 mm, polymer jacket—3.9 mm, 48 fibers: steel tube—3.5/3.2 mm, polymer jacket—5.0 mm; 60 fibers: steel tube—3.9/3.6 mm, polymer jacket—5.0 mm.

Another advantage of the steel tube 82 is its relatively larger stiffness for its small size. Conventional cables having small diameters (e.g., in the range from 3.9 to 5.5 mm) and traditional polymer jacket construction would have much lower stiffness compared to larger cables (e.g., in the range from 10 to 25 mm) of traditional construction. Cables with low stiffness can be installed by pure blowing, but installation by pushing of low stiffness cables is difficult, and installation length is limited. Cables with higher stiffness can be installed by a synergy of pushing and blowing according to U.S. Pat. Nos. 4,850,569 and 4,934,662 (Griffioen). When cables 32 containing small diameter metal tubes are installed according to the present invention, with pre-straightening, pushing and/or blowing, about twice the installation length is reached as with pure blowing. Also, the number of cables and fiber density in each guide tube 18 can increase, thus increasing the fiber capacity of the feeding ducts and branch ducts.

Traditional cables have a stiffness that is around the optimal value for synergetic pushing and blowing. Small cables of conventional construction would be on the lower side of this optimal stiffness. The stiffness is proportional to the diameter to the power of 4, i.e. the stiffness of cables of small diameter and conventional construction will be much lower than for traditional cables. However, with the small diameter steel jacket construction the stiffness is considerably higher and, again, optimal synergy of pushing and blowing is obtained, making possible substantially longer installation lengths.

For pushing and blowing of the cables into the dedicated channel formed by the guide tubes, powered drive wheels are preferred for use in cooperation with pressurized air flow provided by a compressor as shown in FIG. 2. The drive equipment and the compressor are smaller, since only one cable 32 is blown in at a time. The side-pressure of the drive wheels 36,38 should be adjusted in accordance with cable properties for minimal slip. No pre-lubrication is needed when the guide tubes 18 already have a pre-lubricated inside layer. The forward end of each cable is sealed by a small and smooth brass or steel cap, e.g. screw-threaded, to avoid sticking of the cable in the guide tube. According to the invention, to improve installation performance, the roller-set straightener 30 is used to pre-straighten the cable 32 before insertion into the blowing unit 28.

For the sake of completeness, it is further noted that the method of the invention is suitable for installing copper wire cables and power cables as well as optical fiber cables.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

We claim:

1. An apparatus for installing a cable in a duct comprising, in combination:
   a cable storage apparatus for supplying a length of cable to be installed;
   a cable insertion unit for pulling the cable from the cable storage apparatus and introducing the cable into a duct;
   a straightener unit disposed between the cable storage apparatus and the duct for reducing cable bends, the straightener unit including
      first means engagable with the cable for constraining it to move along a first undulating path as the cable advances toward the duct; and
      second means engagable with the cable for constraining it to move along a second undulating path as the cable advances toward the duct.

2. The cable installation apparatus according to claim 1 wherein the first cable constraining means includes a first set of serially adjacent rollers disposed along the first undulating path and the second cable constraining means includes a second set of serially adjacent rollers disposed along the second undulating path.

3. An apparatus for installing a cable in a duct comprising, in combination:
   a cable storage apparatus for supplying a length of cable to be installed;
   a cable insertion unit for pulling a length of cable from the cable storage apparatus and introducing the cable into a duct;
   a straightener unit disposed for engagement with the cable for reducing bends in the cable as the cable is pulled from the cable storage apparatus, the straightener unit including
      first means engagable with the cable for alternately deflecting the cable in opposite directions transverse to the direction of cable movement as the cable advances toward the duct; and
      second means engagable with the cable for alternately deflecting the cable in opposite directions transverse to the direction of cable movement as the cable advances toward the duct.

4. The cable installation apparatus according to claim 3 wherein the first cable deflecting means includes a first set of serially adjacent straightener rollers disposed along a first path of cable advance and the second cable deflecting means includes a second set of serially adjacent straightener rollers disposed along a second path of cable advance, the serially adjacent straightener rollers of the first set and the second set subjecting the cable to a series of oppositely directed bendings in a first plane and then subjecting the cable to a series of oppositely directed bendings in a second plane as the cable advances toward the duct.

5. An improved cable coiling apparatus including a frame, a coiling basket mounted on the frame, a fixed guide arm mounted on the frame, a spinning guide arm mounted for rotation on the frame and multiple pairs of guide wheels mounted on the fixed guide arm and on the spinning guide arm for engaging a length of cable and guiding the cable during cable coiling and uncoiling operations, wherein the improvement comprises:
   the fixed guide arm including a curved arm portion leading to the frame and multiple pairs of guide wheels mounted on the curved arm portion for engaging a length of cable and guiding the cable during coiling and uncoiling operations; and
   multiple pairs of guide wheels mounted on the frame and extending along a curved path forming a guide loop of about one turn for engaging a length of cable and guiding the cable into and out of the coiling basket during coiling and uncoiling operations.

6. The cable coiling apparatus according to claim 5, wherein the frame includes a substantially circular frame member and the multiple guide wheels defining the guide loop are mounted on the circular frame member.

7. The cable coiling apparatus according to claim 5, wherein the guide wheels of each pair are separable to allow initial placement and loading of the length of cable along the guide loop.

8. The cable coiling apparatus according to claim 5, wherein the coiling basket has a coiling radius and the radius of curvature of the guide loop is substantially equal to the coiling radius.

9. The cable coiling apparatus according to claim 5, wherein the coiling basket has a coiling radius and the extended portion of the fixed guide arm is curved so that the multiple pairs of guide wheels mounted on the curved arm portion define a curved guide loop having a radius of curvature that is substantially equal to the coiling radius.

10. A cable installation apparatus comprising, in combination:
    a cable coiling apparatus for storing a length of cable to be installed in a duct;
    a cable insertion unit including mechanically driven means for pulling the cable from the coiling apparatus and pushing the cable into the duct; and
    a cable straightener assembly disposed between the cable coiling apparatus and the cable insertion unit, the cable straightener assembly including a first set of serially adjacent straightener rollers disposed along a first path of cable advance and a second set of serially adjacent straightener rollers disposed along a second path of cable advance, the serially adjacent rollers of the first set and the serially adjacent rollers of the second set subjecting the cable to a series of oppositely directed bendings in a first plane and then subjecting the cable to a series of oppositely directed bendings in a second plane as the cable advances toward the duct.

11. The cable installation apparatus according to claim 10, and further including apparatus forming a guide loop of about one turn disposed between the cable coiling apparatus and the cable straightener assembly.

12. The cable installation apparatus according to claim 11, wherein the guide loop apparatus comprises a tubular duct having a first open end and a second open end through which the cable to be laid is extended, and the tubular duct is arranged along a curved path.

13. The cable installation apparatus according to claim 10, wherein the cable coiling apparatus includes a curved frame member and the guide loop apparatus comprises multiple pairs of guide wheels mounted on the curved frame member.

14. The cable installation apparatus according to claim 10, wherein the guide wheels constrain the cable to follow along a cable guide path having a radius of curvature that is substantially equal to the coiling radius of the cable coiling apparatus.

15. A cable coiling apparatus comprising a frame, a coiling basket mounted on the frame, a fixed guide arm mounted on the frame, a spinning guide arm mounted for rotation on the frame and multiple pairs of guide wheels mounted on the fixed guide arm and on the spinning guide arm for engaging a length of cable and guiding the cable during cable coiling and uncoiling operations, and cable guide apparatus forming a guide loop of about one turn disposed adjacent the frame, wherein the cable guide loop apparatus comprises a tubular duct having a first open end and a second open end through which the cable is fed during a coiling operation and through which the cable is advanced during an uncoiling operation.

16. An apparatus for installing a length of cable in a duct comprising, in combination:

a cable storage apparatus for supplying a length of cable to be installed;

a cable insertion unit including mechanically driven means for pulling the cable from the cable storage apparatus and pushing the cable into the duct;

a cable straightener unit disposed for engagement with the cable for reducing bends in the cable as the cable advances toward the duct, the cable straightener unit including first means engagable with the cable for subjecting the cable to a series of oppositely directed bendings in a first plane as the cable advances toward the duct; and second means engagable with the cable for subjecting the cable to a series of oppositely directed bendings in a second plane as the cable advances toward the duct.

17. The cable installation apparatus as set forth in claim 16, wherein the cable insertion unit comprises a source of pressurized air for propelling the cable through the duct at least in part by pressurized air blowing-assisted transport.

18. The cable installation apparatus as set forth in claim 16, wherein the cable insertion unit comprises:

mechanically driven wheels for pulling the cable from the coiling apparatus and pushing the cable into the duct; and a source of pressurized fluid for propelling the cable through the duct at least in part by pressurized fluid-assisted transport.

19. The cable installation apparatus as set forth in claim 16, wherein the cable insertion unit comprises:

mechanically driven tractor treads for pulling the cable from the coiling apparatus and pushing the cable into the duct; and a source of pressurized air for propelling the cable through the duct at least in part by pressurized air blowing-assisted transport.

20. An apparatus for installing a cable in a duct comprising, in combination:

a cable insertion unit for introducing a cable into a duct;

a straightener unit disposed for engagement with the cable for reducing bends in the cable as the cable advances toward the duct, the straightener unit including a first set of straightener rollers engagable with the cable for subjecting the cable to a series of oppositely directed bendings in a first plane as the cable advances toward the duct; and a second set of straightener rollers engagable with the cable for subjecting the cable to a series of oppositely directed bendings in a second plane as the cable advances toward the duct.

* * * * *